Dec. 15, 1936.  P. P-G. HALL  2,064,304
CUTTER HEAD
Filed Oct. 2, 1935
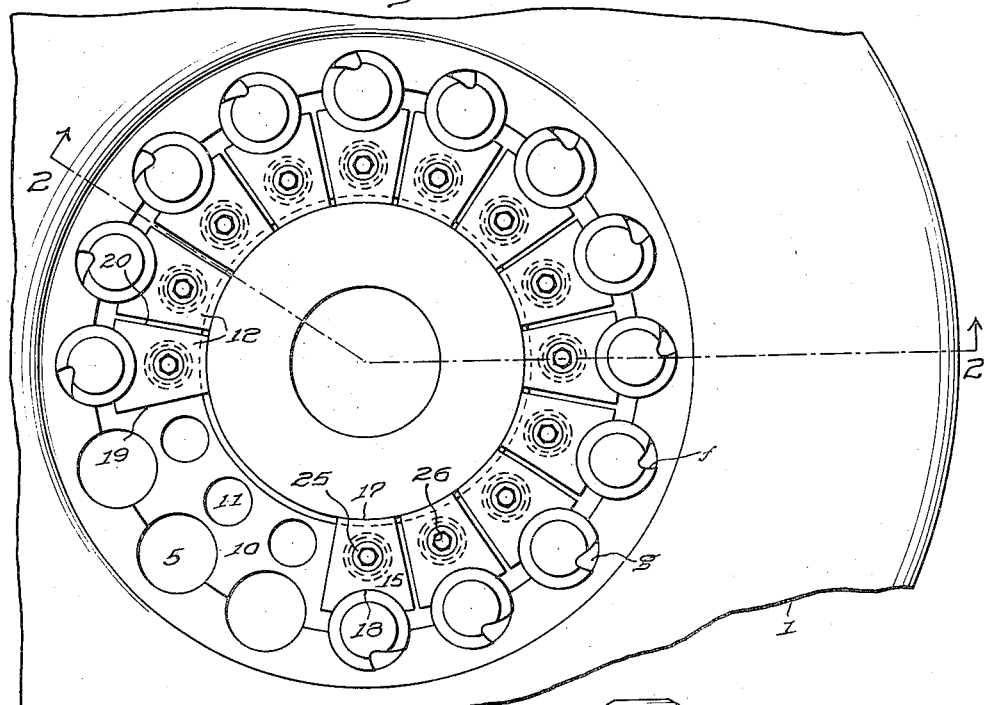
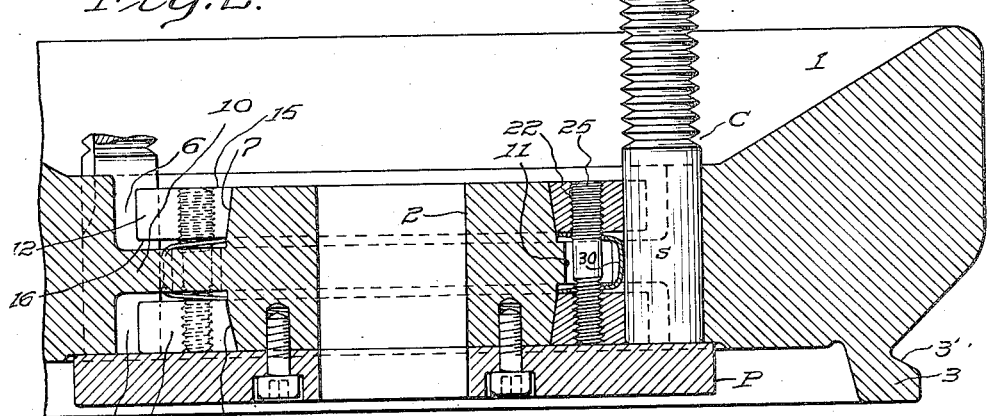
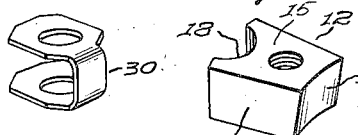
INVENTOR
Peter P-G. Hall.
ATTORNEY
WITNESS Patented Dec. 15, 1936

2,064,304

UNITED STATES PATENT OFFICE 2,064,304

CUTTER HEAD

Peter P-G. Hall, Philadelphia, Pa.

Application October 2, 1935, Serial No. 43,159

8 Claims. (Cl. 29—105)

This invention relates to cutter heads comprising removable cutting elements such as are widely used in connection with milling machines and other machine tools.

Such heads essentially comprise a base or body, usually of annular form, carrying a plurality of cutting elements, the specific character of which is determined by the work to be performed, and means for operatively securing them firmly in the base so that when assembled therewith all the elements are held in proper relation to the base and to each other.

The principal object of the invention is to provide improved means for removably holding the cutting elements in the base of a cutter of the general character of that to which I have referred.

A further object is the provision of such means which are simple in design and construction, may be readily manufactured, are adapted for rapid and easy manipulation in the operations of securing the cutting elements in the base or removing them therefrom; which facilitate the proper positioning of the cutters with relation to each other and to the base when they are being assembled therein and which, after such assembly, are effective to positively hold the elements in place.

Other objects, advantages and novel features of design, construction and arrangement comprehended by the invention are hereinafter more particularly pointed out or will be readily apparent to those skilled in the art from the following description of a cutter head constructed in accordance therewith and illustrated in the accompanying drawing, in which Fig. 1 is a top plan view of the head with certain of the cutting elements assembled and secured therein;

Fig. 2 is a fragmentary axial section on line 2—2 in Fig. 1;

Fig. 3 is a perspective view of one of the pressure springs preferably, though not necessarily, employed in the practice of the invention, and Fig. 4 is a perspective view of one of the wedging elements.

In the several figures of the drawing like symbols are used to designate the same parts.

In accordance with usual practice, the cutter head comprises an annular base 1 having a central bore 2 through which an arbor may be extended for supporting the head in a milling or other machine tool although the base I have chosen to illustrate is also provided with an annular flange 3 on its rear face comprising a tapered surface 3' to enable it to be secured to a face plate forming part of the machine in which it is to be used in accordance with the invention disclosed and claimed in my application for U. S. Letters Patent Serial No. 40,036, filed September 11, 1935, entitled Centering and clamping means for machine tool parts and the like. It will of course be appreciated, however, that the particular manner of mounting the head in the milling or other machine and the means employed for the purpose form no part of the present invention which is concerned solely with the assembly and securement of the cutting elements in the base.

These elements are designated as C and the parts thereof designed to operate on the work may be of any type suitable for the purpose. The elements shown, however, are adapted for producing a helical thread in the work when the cutter head as a whole is moved about it in a planetary path and simultaneously imparting a longitudinal movement corresponding to the pitch of the desired thread; each element therefore in its operative part is generally cylindrical in cross section and comprises a plurality of form threads $t$ without pitch and a longitudinal groove $g$ cut transversely thereof to form a cutting face $f$ in the well known manner. Each element also comprises a cylindrical shank $s$ designed for reception in base 1 which is provided with bores 5 adapted to snugly receive said shanks, number of bores at least equaling the number of elements to be employed. The cutter illustrated in the drawing is designed to receive sixteen elements, but of course any other number may be utilized, and comprises bores spaced equidistantly from the axis of the base and from each other with their axes lying parallel to its axis, but for certain classes of work the axes of the bores may be slightly inclined thereto if preferred.

The front or upper face of the base, viewed as in Fig. 2, is provided with an annular recess 6 the outer periphery of which intersects bores 5 preferably on a circle coincident with their axes. The inner side or wall 7 of the recess, that is, the side lying adjacent the axis of the base, is inclined or beveled slightly toward said axis from a point adjacent the bottom of the recess, the specific degree of this inclination being largely a matter of choice. It has been found in practice, however, that good results are attained when the wall lies at an angle of approximately 10° to the said axis.

The rear face of the base is provided with a preferably similar recess 8 but having its inner side or wall 9 inclined oppositely to the wall 7, and as the two recesses are in axial alignment there is left a relatively thin web 10 between the center portion of the base and the marginal portion beyond the outer walls of the recesses. This web is provided with a number of holes 11 corresponding in number to but of smaller diameter than bores 5 and with their centers respectively lying on the same radii as the centers of the latter and so located that the holes lie between the bores and the inner walls of the recesses.

There is also provided to plurality of wedges 12 corresponding in number to the bores and adapted to seat in recess 6 and a like number of wedges 13 adapted to seat in recess 8, and since all the wedges are preferably alike a description of any one will suffice. Thus, as best shown in Fig. 4, each wedge 12 comprises a block of metal, desirably of slightly less thickness than the depth of the recess in which it is designed to seat, having parallel upper and lower faces 15, 16 and an inner end face 17 conforming to the arc of the inner wall of the recess and inclined in correspondence therewith, an outer end face cut out as at 18 on an arc corresponding to the curvature of the shanks of the cutting elements and side faces 19, 20 respectively normal to faces 15 and inwardly converging from the outer to the inner edge of the wedge, so that when the wedges are in position they will respectively lie in recess 6 between its inner wall 7 and bores 5, the width of the wedges and angular disposition of their sides being such that when so assembled they are slightly spaced apart as shown in Fig. 1. Likewise the other series of wedges 13 in recess 8 are preferably similar to wedges 12 and correspondingly disposed but of course in inverted position.

Each wedge is provided with a threaded hole 22 about midway of its ends and each aligned pair of wedges is connected by a stud bolt 25 extending through the adjacent hole 11 in web 10 and projecting therefrom in opposite directions into the wedges, the bolts preferably having hexagonal countersinks 26 in their ends adjacent the front face of the head to receive a wrench.

The threads on the ends of the bolt, and of course the corresponding threads in the wedges, are preferably, and as shown, of the same hand and of different pitch whereby when the bolt is turned the wedges are moved toward or away from each other simultaneously depending on the direction of rotation of the bolt. Owing to the great amount of power which can be exerted to move the wedges when threads of the same hand but different pitch are employed, I consider that construction preferable to the employment of threads of different hand but the same pitch although either arrangement may be used.

As there is considerable clearance between the hole 11 and the unthreaded center portion of the bolt, it is possible when the latter is unscrewed a few turns to push the wedges inwardly on the inclined surfaces against which their inner ends abut and thus retract them from adjacent bore 5 to allow the shank of a cutting element to be easily inserted into the latter. Thereafter, setting up on the bolt in the opposite direction draws the aligned pair of wedges together and through their coaction with the inclined inner walls of the recesses they are forced radially outward to bring the cut-outs in their ends against the shank of the element, and it is found in practice that owing to the relatively slight angle of inclination of the wedging surfaces and the power which can be exerted on the wedges through the bolt, enormous pressure can be very readily exerted on the shank to positively prevent its rotation or longitudinal displacement relatively to the base under any operative condition to which the head may be subjected.

The several cutting elements can therefore be assembled and locked in the base or released therefrom in a minimum of time and with little effort while any one of them can be individually secured, released or adjusted with equal facility.

When the cutting elements are designed to produce a thread and in many other cases, such as when they are to be used for form milling and the like, it is essential that corresponding points on all of them be disposed in the same plane normal to the axis of the head, and to insure this alignment when assembling the elements in the base, I may removably bolt to the rear face thereof an annular gage plate P of sufficient diameter to overlie bores 5 and thus form a seat for the ends of the element shanks as shown in Fig. 2; this plate may be either allowed to remain on the base when the head is in use or removed therefrom after assembly of the elements.

Additionally, with many forms of elements such, for example, as those illustrated, it is essential that all of them be so adjusted that a given point on each, for example the line of intersection of cutting face $f$ with the peripheral surface of the element, shall bear the same relation to the radial planes respectively intersecting the axis of the head and the axes of the elements, so that as the head is carried about the work the elements will consecutively attack it in the same way. To this end the operator usually first assembles all the elements loosely in their respective bores with the wedges backed off and then, assisted by a suitable gage (not shown) turns them individually to proper position preparatory to setting up on bolts 25. In practice, however, this has been found somewhat difficult of accomplishment for the reason that frequently one element after it has been adjusted may by accident be turned slightly during adjustment of succeeding elements despite the fact the element shanks are of course carefully machined to form a snug but rotatable fit in bores 5.

I therefore preferably provide means for exerting on each element shank when seated in its bore 5 a yielding pressure insufficient to prevent the element from being readily rotated while it is being adjusted yet great enough to hold it in position thereafter until the bolts are set up. More specifically, I prefer to arrange between each pair of wedges a U-shaped spring 30 best shown in Fig. 3, the arms of which are provided with holes adapted to register with the adjacent hole 11 in web 10 to thus enable the bolt to extend through them. The spring is so formed that the free ends of its arms normally respectively engage the inner walls of recesses 6, 8 when the spring is in position while the portion of the spring connecting the arms extends very slightly into adjacent bore 5. Desirably, these walls adjacent web 10 are machined straight instead of inclined for a short distance on each side of the web to form suitable abutting surfaces of the inner ends of the spring arms while the parts are so proportioned that sufficient clearance between the web and the adjacent faces of the wedges is afforded for the arms even when the wedges are drawn together to the maximum extent. Thus, when the wedges are backed off it is possible to slip the element shank into bore 5, the spring being compressed endwise slightly during this operation, and after the shank is in position the spring then exerts thereon a light but yielding pressure which is normally sufficient to prevent accidental rotation of the element during assembly.

It will thus be apparent that through the medium of my invention the cutting elements may be securely clamped in the cutter base in any desired position of rotative and longitudinal adjustment and as readily released therefrom when desired; that as the wedges are always maintained in association with the base irrespective of whether all or any of the cutting elements are in place, there is no danger of any of the parts becoming lost or misplaced, while none of them is of such character as to become readily damaged or incapable of performing its intended function under ordinary conditions of use.

Furthermore, while I have more particularly referred to the invention as embodied in a milling cutter head comprising a plurality of removable cutting elements, it will be appreciated that its principles may be utilized with equal facility and advantage in many other machine tools and parts thereof while the details of design, construction and arrangement of the instrumentalities employed in the practice of the invention may be modified and varied from those herein disclosed without departing from the spirit and scope of the invention as defined in the appended claims.

Having thus described my invention, I claim and desire to protect by Letters Patent of the United States:

1. A cutter head comprising a base having a bore adapted to receive the cylindrical shank of a cutting element and means for securing said shank in the base comprising a pair of wedges spaced apart axially of the bore, each having an arcuate surface of radius conforming to the radius of the shank and the bore adapted for engagement with the shank when inserted therein and an inclined wedging face remote from said surface and cooperable with a correspondingly inclined surface on the base, and means for drawing the wedges together to thereby, through coaction of their inclined faces with said surfaces, cause them to move radially of the bore to force their arcuate surfaces against the shank.

2. A cutter head comprising a base having a series of bores equidistantly spaced from its center, each adapted for the reception of the cylindrical shank of a cutting element, a pair of wedges respectively disposed adjacent opposite ends of each bore, one end of each wedge partially conforming to an arc of the same radius as the bore and the cylindrical shank and its opposite end inclining to the axis thereof, the base also having inclined surfaces respectively cooperative with the inclined ends of the wedges to force the latter radially toward said axis when the wedges are drawn together, and a stud bolt threaded into each pair of wedges for moving them toward and away from each other.

3. A cutter head comprising a base having a plurality of annularly spaced bores disposed equidistantly about its central axis respectively adapted to receive the shanks of cutting elements, and an annular recess in each of its faces intersecting said bores and having its inner wall proximate to said axis inclined thereto, and means for removably securing said shanks in said bores after insertion thereinto comprising a pair of wedges respectively disposed in said recesses adjacent each bore, each wedge being formed at one end to engage the adjacent shank and at its other end having an inclined surface cooperative with the inclined wall of the recess to move the wedge radially toward the shank when the wedges are drawn toward each other, and a stud bolt threaded into each pair of wedges for simultaneously drawing them together or forcing them apart.

4. A cutter head comprising a base having a plurality of annularly spaced bores respectively adapted to receive the shanks of cutting elements disposed equidistantly from its central axis and an annular recess in each of its opposite faces intersecting said bores, the inner walls of the recesses proximate to said axis being oppositely inclined with respect thereto, and means for removably securing said shanks in the bores after insertion thereinto comprising a pair of wedges respectively disposed in said recesses adjacent each bore, each wedge being adapted at one end to engage the adjacent shank and at its other end to cooperate with the inclined wall of the recess to move the wedge radially toward the shank when the wedges are moved toward each other, and a stud bolt threaded into each pair of wedges for simultaneously drawing them together or forcing them apart.

5. A cutter head comprising a base having a plurality of annularly spaced bores respectively adapted to receive the shanks of cutting elements disposed equidistantly from its central axis and an annular recess in each of its opposite faces intersecting said bores, the inner walls of the recesses proximate to said axis being oppositely inclined with respect thereto, and means for removably securing said shanks in the bores after insertion thereinto comprising a pair of wedges respectively disposed in said recesses adjacent each bore, each wedge being adapted at one end to engage the shank therein and at its other end to cooperate with the inclined wall of the recess to move the wedge radially toward the shank when the wedges are moved toward each other, and a stud bolt threaded into each pair of wedges for simultaneously drawing them together or forcing them apart, the threads on the opposite extremities of the bolt being of different pitch.

6. A cutter head comprising a base having a bore adapted to receive the shank of a cutting element and oppositely inclined surfaces respectively adjacent the ends thereof, wedges respectively disposed between said surfaces and the bore, means for drawing the wedges together to simultaneously move them along said surfaces and radially of the bore to bring them into engagement with the shank of the element when disposed therein, and a spring interposed between the wedges and extending slightly into the bore adapted to exert a yielding pressure on the shank when so disposed.

7. A cutter head comprising a base having a bore adapted to receive the shank of a cutting element and annular recesses in its opposite faces intersecting said bore, each recess having an inclined wall, wedges respectively seated in the recesses abutting said wall, a stud bolt extending into both wedges operable to draw them together and thereby force the wedges radially of the bore through their coaction with said inclined surfaces, and a U-shaped spring interposed between the wedges, surrounding said bolt and projecting slightly into the bore operative to exert a yielding pressure on the element shank when disposed therein.

8. A cutter head comprising a base having a bore adapted to receive the shank of a cutting element and annular recesses in its opposite faces intersecting said bore, each recess having an inclined wall, wedges respectively seated in the recesses abutting said wall, a stud bolt extending into both wedges operable to draw them together and thereby force the wedges radially of the bore through their coaction with said inclined surfaces, and a U-shaped spring interposed between the wedges about the bolt with its free ends engaging the base and its opposite end projecting slightly into the bore operative to exert a yielding pressure on the element shank when disposed therein.

PETER P-G. HALL.